Oct. 23, 1956     T. O. BRANDON     2,767,749
MACHINE FOR SHAPING GOLF CLUB HEADS
Filed March 1, 1955     3 Sheets-Sheet 1

INVENTOR.
Thomas O. Brandon
BY
Johnson and Kline
ATTORNEYS

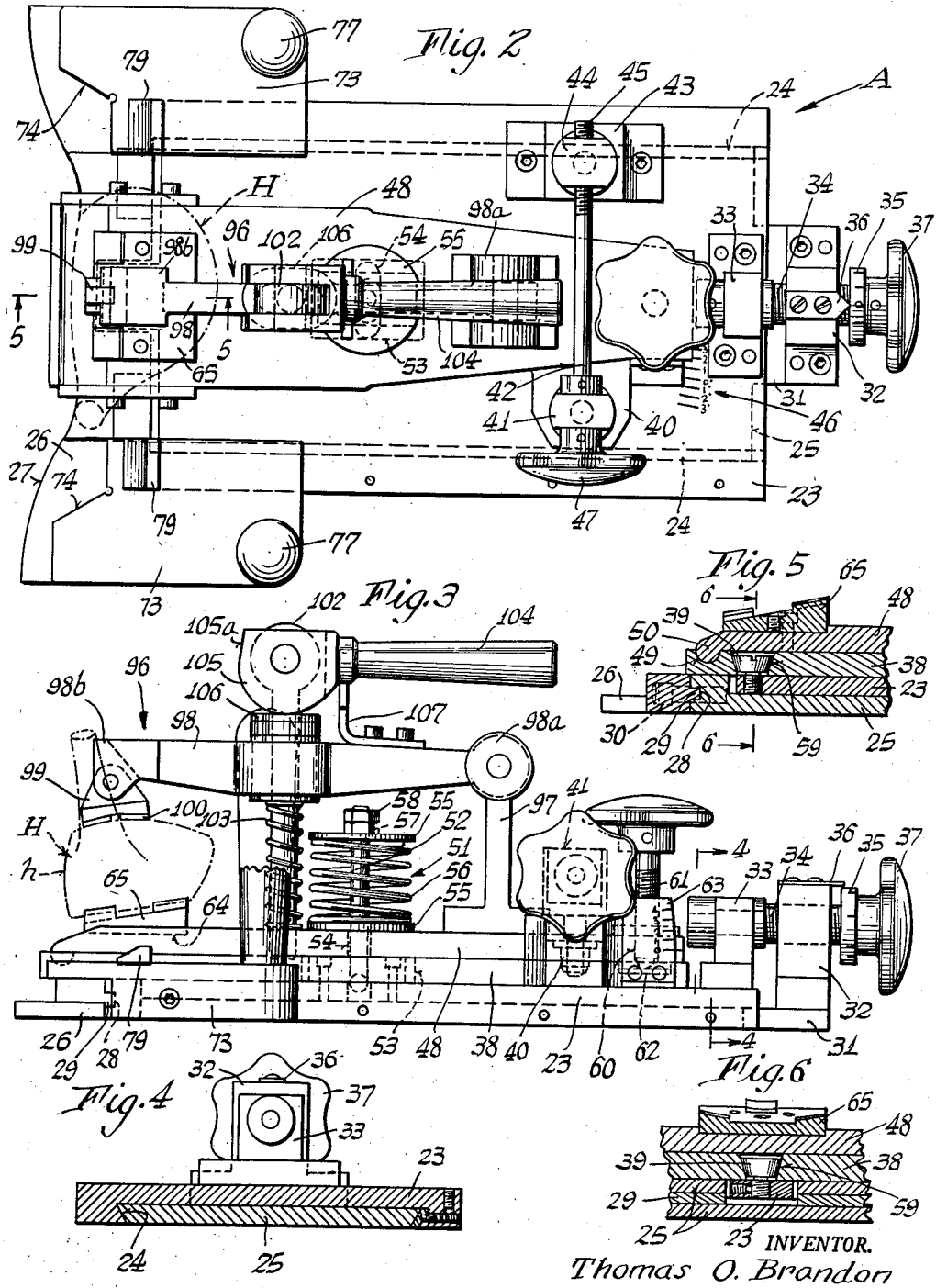

Oct. 23, 1956   T. O. BRANDON   2,767,749
MACHINE FOR SHAPING GOLF CLUB HEADS
Filed March 1, 1955   3 Sheets-Sheet 3
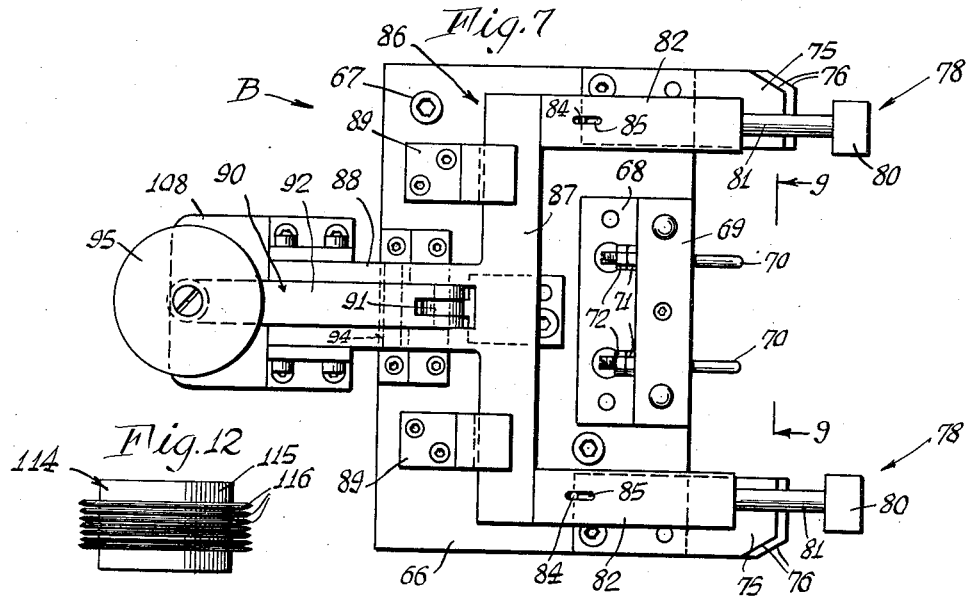
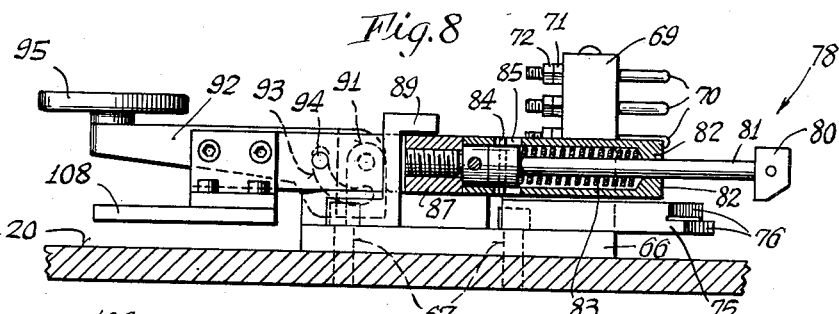
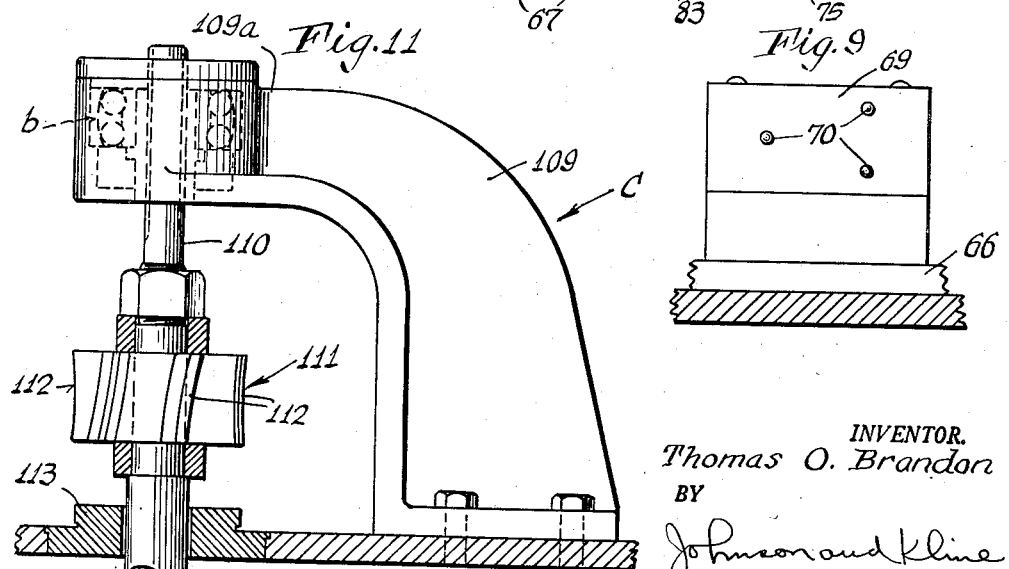
INVENTOR.
Thomas O. Brandon
BY
Johnson and Kline
ATTORNEYS United States Patent Office 2,767,749
Patented Oct. 23, 1956

2,767,749

MACHINE FOR SHAPING GOLF CLUB HEADS

Thomas O. Brandon, Cucamonga, Calif., assignor to A. G. Spalding & Bros. Inc., Chicopee, Mass., a corporation of Delaware Application March 1, 1955, Serial No. 491,353

13 Claims. (Cl. 144—134)

This invention relates to an apparatus for use in making golf clubs and more particularly to an apparatus for forming a face portion on the head of a golf club of the wood type.

Heretofore, in shaping such a face designed according to certain definite theoretical and/or practical proportions, it was the practice in the art to form the face by hand as by filing or other like cutting operation. However, it was practically impossible to duplicate the curvatures on the faces in this manner and also, it was costly, time-consuming and required the talent of a skilled artisan taking years of experience to acquire. At best, even the most skilled of artisans could only hope to approach the desired facial proportions so that it was impossible to maintain any uniformity in the shaping of a face on clubs.

The present invention overcomes these difficulties by providing an apparatus which will quickly, uniformly and accurately shape a face on the head portion of a golf club as required, and will accurately reproduce such a face on all similar clubs.

This is accomplished by providing a carriage for the head and having means for accurately locating the head on the carriage in predetermined relation to a cam means on said carriage, said cam having an operative surface corresponding to the transverse curvature of the head so as to guide the carriage as it is moved over a supporting surface and into cooperative relationship with a cutting means to provide the required face on the club head.

A feature of the invention resides in the provision of a novel locating means cooperating with the carriage which accurately aligns and locates the carriage with respect to the face locating means and which locks the carriage in position for each operation so that the head can be accurately positioned thereon whereby duplicate faces can be provided on a plurality of clubs of the same type.

Another feature of the invention resides in the provision of a carriage construction in which the carrier or seat for the head is readily adjustable in three directions so as to provide accurate location of the club head with respect to the carriage for proper positioning of the face to the cutter.

Another feature of the invention resides in the locking of the head in proper position on the carrier whereby subsequent facing operations may be quickly and accurately performed thereon at one or more stations.

Another feature of this invention resides in the provision of an apparatus for shaping a face on the head of a golf club which is relatively simple to set up, requires a minimum of handling of the head, and which requires only a workman of ordinary skill to operate.

Another feature of this invention resides in the provision of an apparatus wherein increased productivity and uniformity is attained in the forming and duplication of faces on heads of clubs.

Other features and advantages will be apparent from the specification and claims when considered with the drawings in which:

Fig. 2 is a plan view of the club carriage.

Fig. 3 is a side elevational view of the club carriage.

Fig. 4 is a sectional view taken along line 4—4 of Fig. 3.

Fig. 5 is a sectional view taken through line 5—5 of Fig. 2 with the clamping means omitted.

Fig. 6 is a sectional view taken along line 6—6 of Fig. 5.

Fig. 7 is a plan view of the locating means.

Fig. 8 is a side elevational view of the locating means having portions thereof in section.

Fig. 9 is a partial side elevational view taken along lines 9—9 of Fig. 7.

Fig. 11 is a side elevational view of a shaping tool assembly for forming the face on the head of a club.

Fig. 12 is a detailed side view of the modified form of a facing tool as used for purposes of scoring.

For the purpose of illustrating the invention there is shown herein a machine for forming a face on the head portions of golf clubs in the "wood" family. The "woods" commonly referred to as the driver, spoon, brassie, or No. 4 wood, are provided with a head having a face portion which may or may not be curved and which heretofore has been shaped by hand. To overcome the disadvantages associated with such manual shaping of the face, this invention provides an apparatus which eliminates the variations occasioned by the manual shaping and which uniformly shapes the face portions in accordance with the desired contours so that each club of a particular kind may be accurately reproduced to have its most efficient characteristics and performance.

While the contours produced by the apparatus of the present invention may be either flat, convex, or concave, as desired, the club herein illustrated is one having a "bulge-type" face, i. e., the head is provided with a face having a convex transverse curvature extending from toe to heel and a convex vertical curvature extending from top to bottom of the head.

Figure 1:
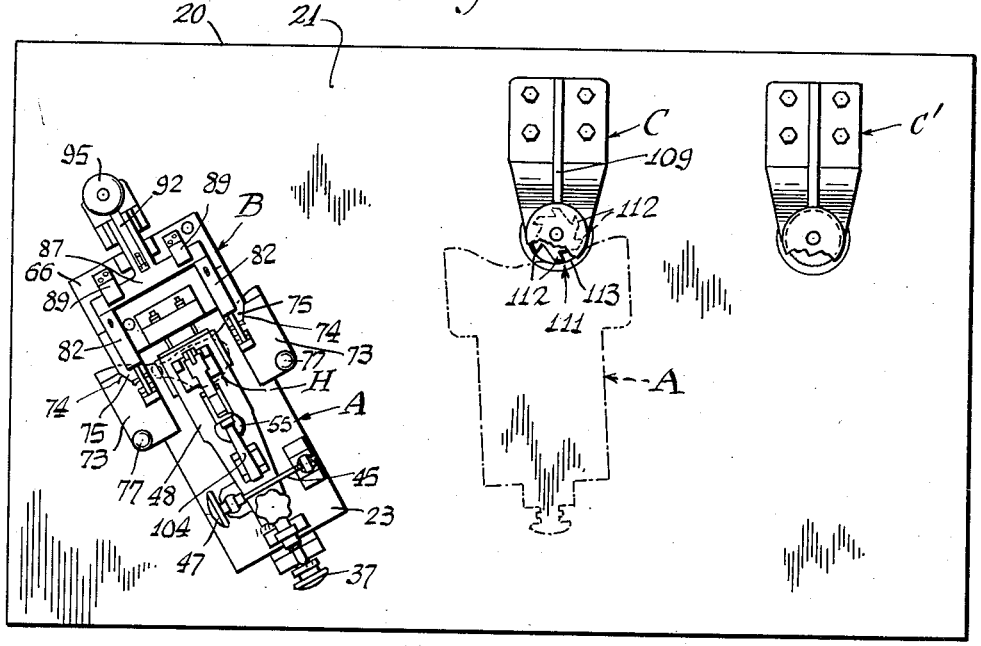
Figure 1 is a top view of a supporting surface having arranged thereon a locating means and a facing fixture or club carriage movably positioned thereon and a plurality of shaping tool assemblies for shaping a face on the head of a golf club on the carriage.

As shown in Fig. 1, this invention includes a frame 20 having a flat and smooth supporting surface 21 having movably positioned thereon a facing means or club carriage A, a locating means B and at least one shaping tool assembly C. For purposes of illustration, Fig. 1 shows two shaping tool assemblies C and C' so that a plurality of facing operations such as shaping and scoring may be successively and continuously performed as will be hereinafter set forth. However, any number of shaping stations may be successively arranged on a suitable support as required.

The facing means or club carriage A is supported on the supporting surface 21 and is arranged thereon to be readily and freely moved over the surface and into successive cooperating relation with the locating means B and the shaping tools C and C'.

As illustrated by the solid lines in Fig. 1, the facing means or club carriage A is shown in cooperating relationship with the locating means B so that a rough head H of a golf club may be accurately positioned on the carriage.

While the carriage may take various forms, the illustrated carriage is composed of a base having a series of superimposed plate members thereon each being adjustable relative to the base 23 and to each other so that a head supported on the uppermost plate member is determinately positioned relative to the lateral, longitudinal and vertical axes of the carriage.

The carriage assembly includes a substantially rectangular bottom plate or base 23 which is in sliding relationship to the supporting surface 21. Extending longitudinally of the base there is provided a dovetail channelway 24 for slidably supporting therein a slide plate 25. As shown in Fig. 4, the bottom of the slide plate is substantially flush with the underside of the base, so that the two cooperate to form a flat, smooth, sliding surface to facilitate movement of the carriage over the supporting surface.

At the front end the slide plate 25 is provided with a cam plate 26 having the outer edge portion 27 thereof formed with a camming surface of a determinate shape to form the transverse curve on the head as required for the particular type head being formed. Since the required transverse curvatures vary for each particular class of "woods" or for each set of "woods," the cam plate 26 is removably mounted to the slide plate 25 so that it may be readily replaced by another having a different curvature, thus rendering the carriage readily adaptable to form a face for any particular kind or class of "woods."

While the cam plates 26 may thus be rendered interchangeable by any suitable means, it is herein preferred to make the cam alone interchangeable. This is accomplished by providing the slide plate with a transversely extending slot 28 in the front edge portion thereof to receive a transversely extending tongue portion 29 of the cam plate 30; and screws 30 secure the cam plate to the slide plate in fixed relationship.

Under some circumstances it may be desired to adjust the slide plate 25 and cam edge 27 thereon with respect to the base 23 so that a head supported on the uppermost plate of the carriage may be determinately positioned relative thereto to control the cut to be made thereon. This is accomplished by providing the slide plate with a projecting portion 31 extending beyond the rear edge of the base and having a bracket 32 aligned with a bracket 33 on the base 23. The brackets 32 and 33 rotatably support an adjusting screw 34 whereby longitudinal movement of the slide on the base can be achieved when the adjusting screw 34 is rotated in either direction causing the slide plate to advance or retract the cam edge 27 longitudinally with respect to the base a corresponding amount. To measure the amount of longitudinal displacement of the cam plate, the adjusting screw 34 has fixed thereto a graduated collar 35 associated with a marker 36, and a handle 37 is secured to the end of the adjusting screw to facilitate the adjustment thereof.

As shown in Figs. 3 to 6, a second or middle plate 38 is pivotally mounted to the base 23 by means of a swivel 39 adjacent the front end thereof as shown in Fig. 5. This arrangement allows the middle plate 38 to be pivoted laterally relative to the longitudinal axis of the base 23 should it be desired to change the relation of the transverse curvature to the head.

In order that the middle plate 38 may be readily adjusted laterally, the middle plate is provided with a laterally projecting tab portion 40 having an adjusting shaft holder 41 rotatably mounted on the tab for supporting one end of an adjusting shaft 42. Aligned laterally of the holder 41 and rotatably mounted in a block 43 fixed to the base 23 is stud 44 which has a threaded opening to engage the threaded end 45 of the adjusting screw. Thus it will be noted that as the adjusting screw or shaft 42 is rotated, the middle plate 38 will pivot laterally about the swivel screw 39 in the desired direction a corresponding amount. If desired, the base 23 may be scored as at 46 adjacent the rear edge of the middle plate so that the amount of lateral displacement may be measured. An operating knob 47 fixed to the end of the shaft 42 facilitates the rotation of the adjusting shaft.

The uppermost plate or top plate 48 which carries the support for the head is hinged to the middle plate 38 so that it may be pivoted for vertical movement. Although the plates 38 and 48 may be hinged together by any suitable means, the illustrated form of the invention accomplishes this by a groove 49 having a semi-circular cross section extending transversely at the front edge portion of the middle plate 38. The top plate 48 having substantially the same shape as the middle plate is provided with a transversely depending projection 50 adjacent the front end thereof shaped to fit the groove as shown in Fig. 5.

To maintain the base 23 and plates 38 and 48 in cooperating relationship a spring assembly 51 is provided to urge the plates 38 and 48 together. As shown in Fig. 3 this is accomplished by a stud 52 mounted to the base at one end and having the shank portion extending upwardly through aligned openings 53 and 54 in the middle plate and the top plate respectively. A pair of spaced spring seats 55 engaging therebetween the ends of a compression spring 56 is arranged on the extended portion of the stud. Thus the spring tends to urge the plates 38 and 48 into cooperating relationship. If desired, the amount of force exerted by the spring 56 may be regulated by adjusting the nut 57 disposed on the upper end of the stud and which is topped by a lock nut 58 to secure the nut 57 in the adjusted position.

Because the swivel 39 is countersunk in a tapered opening 59 of the middle plate 38, the top plate 48 may be pivoted from a substantially horizontal position wherein it lies flush on the middle plate to a vertically raised position, thus varying the pitch of the face when so desired. For regulating the amount of vertical displacement of the top plate relative to the middle plate, the rear portion of the top plate is provided with a threaded opening 60 through which an elevation adjusting stud 61 is threaded, the end of the stud bearing against the middle plate so that the rotation thereof raises or lowers the rear end of the top plate about the hinge 50 a corresponding amount. To protect the middle plate 38 against the frictional bearing of the elevating stud 61, a cushioning pad 62 is positioned between the middle plate 38 and the top plate 48. If desired, an elevation dial 63 is positioned adjacent the elevating adjusting stud 61 so that the amount of elevation may be measured and/or set. As herein described, the spring assembly 51 not only secures the plates in cooperating relationship but also exerts a force to counteract that of the vertical adjusting stud 61.

At the forward end the top plate is provided with a recessed portion 64 for receiving a seat pad or saddle 65 upon which the rough head H of a golf club is supported. As shown, the pad 65 is shaped to support the rough head thereon in a definite predetermined relationship on the carriage. Because each particular type of club which is to be faced requires its own respective seat pad or saddle in order that the predetermined relationship may be maintained with respect to the carriage, it is preferred that the seat pads 65 be readily removably mounted on the top plate so that they are interchangeable to accommodate a particular kind or class of head. This is accomplished by removably securing the pad 65 to the top plate 48 by any suitable means such as set screws, pins or the like.

With this carriage, a head H supported on the pad seat 65 fixed to the top plate can be adjusted laterally by pivoting the middle plate 38 transversely relative to the base plate 23 and vertically by pivoting the top plate 48 relative to the middle plate 38 and base plate 23. Further, by adjusting the slide plate 25 with respect to the base 23 the location of the cam edge 27 with respect to the head can be varied.

In order that a rough head may be properly seated on the carriage so that a face may be accurately formed, the carriage is moved into cooperating relationship with a locating means B; and according to this invention the carriage is manually shifted into cooperating relationship therewith.

Figure 10:
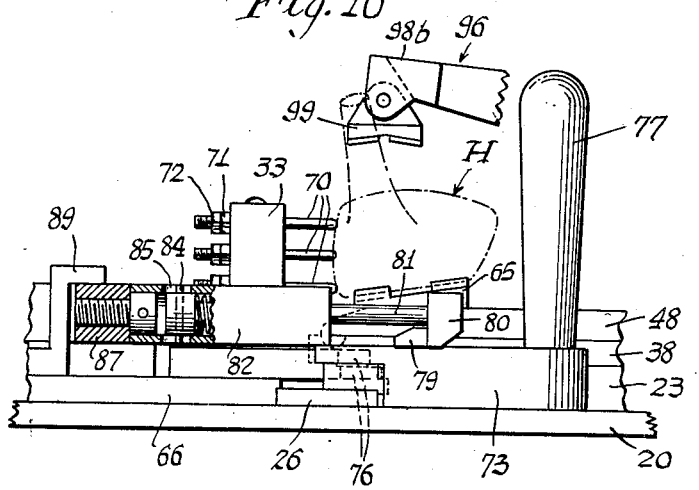
Fig. 10 is a partial side elevational view of the locating means and club carriage in locked relationship.

The locating means B includes a base plate 66 which, in the illustrated form of the invention, is fixed to the supporting frame 20 by suitable bolts 67. Positioned on the base midway between the side edges and adjacent the front edge thereof is a member 68 having a leg 69 extending upwardly therefrom for supporting a plurality of relatively fixed face-engaging and positioning pins 70 which are arranged to project outwardly from the front face of the leg. As shown in Fig. 8, the rear ends of the pins are threaded to receive an adjusting nut 71 by which the projection pins 70 may be adjusted. If desired, the adjusting nut 71 may be topped by a lock nut 72. The projecting pins 70 function as a multipoint stop or locator for engaging the face of the head in order that the head's irregularly shaped face may be properly positioned on the carriage when the carriage is connected to the locating means as shown in Fig. 10.

Since the head to be faced is roughed out with a face portion which is not co-planar, it is preferred to mount three such pins on member 68 as shown in Fig. 9, since three points are sufficient to locate the desired plane on which to form the face; however, any number of pins may be used to locate other points if desired.

In order to facilitate proper alignment between the carriage A and the locating means B, the two are provided with self-aligning guide means. This guide arrangement consists of guide locating blocks 73 fixed on opposite sides of the carriage base adjacent the front thereof. As shown in Fig. 1, each block is provided with a cam surface 74 which inclines rearwardly to form a recess therebetween. The base plate 66 of the locating means is likewise provided with a pair of guide members 75, one fixed to each front corner of the base plate 66 and which project forwardly thereof. As shown in Fig. 7, the front portions of the guide members are provided with a cam surface 76 to engage the cam surface 74 of the locating guide blocks 73 so that the guide members 75 of the locating means B are received in the recess formed by the guide blocks 73 as the carriage is moved into cooperating relationship with the locating means as shown in Fig. 1. Thus it will be noted that the carriage is automatically and readily aligned with the locating means by simply pushing the carriage into position thereagainst.

Handle means 77 fixed to the guide blocks as shown in Fig. 2 facilitate the operation or the movement of the carriage over the supporting surface.

In accordance with the present invention the carriage is locked in aligned relationship with the locating means B by means of self-latching means which consist of a pair of latch members 78 for interlocking the two together. The carriage has arranged on each guide locating block 73 a cam catch block 79 which engages a latch member 80 fixed to the catch shaft 81 which extends outwardly beyond the front end of the locating means so that as the carriage is moved into cooperating relationship therewith, the latch member 80 fixed to the end of the catch shaft overrides the cam catch block 79 on the carriage to hook the two together. As illustrated in Fig. 8, the catch shaft 81 is mounted in a housing 82 which is loosely mounted on the base plate 66. Shown in Fig. 7 two such housings are provided, one each adjacent the opposite sides of the base plate. Disposed about the catch shaft 81 within the housing is a spring 83 to resiliently secure the catch shaft therein. A pin 84 fixed to the end of the shaft 81 and extending upwardly through a slotted opening 85 in the housing prevents rotation of the shaft 81 and the catch 80 thereon.

The housings 82 are loosely mounted on the base by means of a T-shaped member 86 resting on the base wherein the crossarm 87 of the T member extends transversely of the base plate and a bifurcated stem portion 88 projects rearwardly thereof. A pair of Z-shaped brackets 89 loosely secures the crossarm 87 to the base.

It is at present preferred that the carriage and locating means be securely locked against any relative movement thereof. To accomplish this the latch assembly 78 is provided with an actuating means 90 to take up any lost motion between the parts. A bracket 91 mounted on the base and projecting between the prongs of the stem portion of the T member pivotally supports therebetween a locking or actuating lever 92 as best seen in Fig. 8. The lever 92 is provided with an eccentric arcuate slot 93 through which a pin 94 positioned transversely of the pronged stem extends. Thus it will be noted that as the lever 92 is rotated from a substantially vertical position to a substantially horizontal position about the pivot, the latch assembly 78 is bodily moved rearwardly on the base plate so as to take up any lost motion between the parts. If desired, the locking lever 92 may be provided with a hand pad 95 fixed to the end thereof to facilitate movement thereof.

After the carriage has had the proper cam plate 26 and seat pad 65 applied thereto and has had the proper adjustments made on the plates 23, 38 and 48 so as to provide a particular club, it is locked to the locating means and the head H is then positioned on the seat pad 65 so that the face portion $h$ thereof abuts the end of the locating pins and properly locates the head thereon. The head is then clamped to the carriage so that it is held firmly during a facing operation. With this arrangement any number of club heads may be run successively without further adjustment of the carriage so that the face portion of the club heads may be accurately reproduced in quantity.

While the clamping means 96 may take various forms, the clamping assembly as herein illustrated includes a supporting arm 97 mounted on the top plate rearwardly of the pad seat. A lever 98 having one end 98a thereof pivotally mounted on the support arm extends forwardly so that the other end 98b supporting a clamp 99 overlies the seat pad 65. Thus the seat pad 65 and the clamp 99 cooperate to secure therebetween the head H. If desired, the clamp 99 may be provided with a suitable cushioning substance or material 100 to prevent damage to the head. Intermediate the ends of the lever 98 there is provided an opening for receiving an eye-bolt 102 which is fixed to the top plate. Disposed around the shank of the eye-bolt and between the lever and the top plate is a spring 103 which normally urges the lever 98 upwardly to the released position or open clamp position.

In order to move the lever into clamping position for securing the head in adjusted position on the carriage, a handle 104 having a cam 105 is pivotally mounted in the eye of the bolt. As shown in Fig. 3, the cam is eccentrically shaped so that as the handle 104 is rotated from a substantially vertical position to a substantially horizontal position, the cam 105 will exert a bearing force on the lever 98 which overcomes the force of the spring 103 causing the clamp to be moved into clamping position to secure the head. If desired, a collar 106 may be disposed between the lever 98 and the cam 105 so that the lever will be protected from the direct bearing force of the cam. A limit stop in the form of a bracket 107 is fixed to the lever to limit the movement of the handle in clamping position as shown in Fig. 3. To limit the handle movement in the open position, the cam 105 is provided with a flat surface 105a which prevents further rotation of the handle.

After the head has been adjusted on the carriage and is securely clamped thereon, the carriage is unlatched from the locating means so that it can be removed for the facing operation. This is accomplished by rotating the locking lever 92 to a vertical position, thereby causing the latch assembly 78 to release the locking pressure between the carriage and the locating means. With the locking pressure so released, a downward force exerted on the bifurcated stem 88 will raise the catch shafts 81 of the latching assembly out of engagement with the catch blocks 79 of the carriage so that the carriage is now free to be moved. In order to facilitate lifting of the catch members 80, a hand pad 108 is fixed to the stem as shown in Figs. 7 and 8. After the carriage is freed it is moved into engagement with a shaping tool assembly C or C'.

In order to accurately shape a bulge-type face on the head and to reproduce such a face in quality and quantity, the carriage A with the rough head H secured thereon is moved transversely past a shaping tool assembly C in a predetermined path. This is accomplished by employing a shaping tool assembly C having an L-shaped supporting arm 109 fixed to the supporting surface wherein the horizontal leg portion 109a spaced above the surface has journaled therein a suitable bearing b for rotatably supporting the upper end of a vertical spindle 110. As shown in Fig. 11 a double-row, ball-bearing ring is utilized. The lower end of the spindle extends through an opening in the supporting surface having its lower end journaled in suitable bearings, not shown. Suitable drive means, not shown, may be provided for rotating the spindle. Predeterminately positioned on the spindle is a cutting tool 111 to perform a particular shaping or cutting operation.

The cutting tool 111 rotatably mounted, as shown in Fig. 11, is provided with a plurality of vane-type substantially vertical cutting edges 112, better seen in Fig. 1, wherein each cutting edge is concavely curved to provide the face with the desired convex curvature extending from top to bottom of the head as the latter is moved transversely of the tool. For guiding the carriage as it moves transversely across the cutting edges 112 of the cutting tool to form the longitudinal curvature simultaneously there is provided a cam guide 113 positioned at the base of the tool assembly C. As seen in Fig. 11, the cam guide 113 extends above the surface of the supporting frame and engages the cam plate 26 of the carriage in the manner illustrated in Fig. 1, by the dotted lines, as it is moved across the cutting tool. Thus the carriage is guided in a determinate path according to the transverse curvature of the cam plate. Therefore, with the head properly supported on the carriage, the face is accurately formed, both as to transverse curvature extending from toe to heel and as to the vertical convex curvature extending from top to bottom, in a single pass of the carriage across the cutting tools. Consequently, a workman of ordinary skill can easily operate the foregoing device to produce a quality and quantity of face portions on heads that heretofore was unobtainable even by the most skilled in the field. Further, since the head can be generally formed in a single pass, the time which was heretofore required to form such a face is greatly reduced.

If desired, a second forming tool assembly C' as shown in Fig. 1 may be sequentially arranged on the support to perform a subsequent facing operation as, for example, to provide the usual scoring on the face. This second tool assembly is similar to that herein described with the exception that the assembly is tooled to perform a scoring operation.

As shown in Fig. 12, the scoring tool 114 comprises a cylinder portion 115 having horizontally spaced thereon a plurality of parallel cutting blades or edges 116. In order that the lines of scoring on the face all be formed of a uniform depth, the cutting edges 116 of the scoring tool are determinately positioned so that the projecting edges of the cutting blades 116 maintain the vertical curvature of the face being formed. Thus as the carriage is traversed past the second tool assembly C' in a successive operation, the face of the club engages the scoring tool 114 which cuts parallel scoring grooves in the face portion.

Although the invention herein shown contains only two such forming assemblies, it will be understood that any number of such assemblies may be sequentially arranged on a supporting surface so that any number of types of shaping operations may be formed as desired.

Thus, by proper tooling of the apparatus as herein described, the device is readily adapted to form any desired facial curvature for any type of club or set of clubs. Further, the device disclosed reduces handling operations to a minimum, expedites the facing operation so that not only is the quality of face improved, but any number of similar face portions can be accurately reproduced. This invention further affords means whereby increased productivity and uniformity is attained by workmen having a lesser amount of skill.

Variations and modifications may be made within the scope of the claims and portions of the improvements may be used without others.

I claim:

1. An apparatus for accurately facing and duplicating faces on heads of golf clubs comprising a supporting frame, a locating means mounted on said frame to aid in positioning a head of a golf club, a facing fixture movable on said frame for supporting a head and for cooperating with said locating means to properly position a head of a golf club thereon, means on said facing fixture to securely clamp the head in predeterminate position thereon; and a shaping means for cooperating with said facing fixture and head secured thereto for shaping a face on said club having a uniform and predetermined contour.

2. An apparatus for accurately facing and duplicating faces on heads of golf clubs comprising a supporting frame, a locating means mounted on said frame to aid in positioning a head of a golf club, a facing fixture having a cam plate, said facing fixture being movably supported on said frame to cooperate with said locating means to properly position a face portion of a golf club head in predetermined position on said facing fixture relative to said cam plate, clamping means on said facing fixture to securely hold the head in predetermined position thereon; a shaping means having a cam guide adapted to cooperate with the cam plate of the facing fixture for predeterminately positioning the face portion of the head relative to said shaping means so that the shaping means forms a face on the head of a golf club having a uniform and predetermined contour.

3. An apparatus for accurately facing and duplicating faces on heads of golf clubs comprising a supporting frame, a locating means mounted on said frame forming a stop to aid in positioning a head of a golf club, a facing fixture having a cam plate, said facing fixture being movably mounted on said frame and adapted to support a head of a golf club thereon to cooperate with said locating means for positioning the head thereon in predeterminate relationship to said cam plate; a plurality of shaping means cooperating with said fixture to perform a successive shaping operation on said head and a cam guide fixed to each shaping means wherein said cam plate of the facing means cooperates successively with the cam guide of each shaping means for predeterminately positioning the said face relative to the respective shaping means so that the shaping means forms a face on the head of a golf club having a predetermined contour and marking thereon.

4. In an apparatus for use in accurately facing and duplicating faces on heads of golf clubs, a portable facing fixture comprising a base adapted to be freely moved over a supporting surface, hand grips on said base to facilitate moving the same over said surface, adjustable means mounted on said base for accurately positioning a head of a golf club thereon and a clamping means mounted on said base to securely clamp a head in predetermined position thereon.

5. In an apparatus for use in accurately facing and duplicating faces on heads of golf clubs, a portable facing fixture comprising a base, said facing fixture being adapted to be freely moved over a supporting surface, hand grips on said base to facilitate moving the same over said surface, adjustable means mounted on said base for accurately positioning a head of a golf club relative to the longitudinal, lateral and vertical axes thereof and a clamping means mounted on said base to securely clamp a head in predetermined position thereon.

6. In an apparatus for use in accurately facing and duplicating faces on heads of golf clubs, a readily portable facing fixture for supporting a head thereon for engagement by a facing cutter comprising a bottom plate, means for supporting a head thereon, a cam plate movably mounted within said bottom plate having an exposed shaping edge, means for adjusting said cam plate longitudinally of said bottom plate so that said edge portion of the cam plate is predeterminately positioned relative to a head supported on said facing fixture, and clamping means arranged on said facing fixture to securely maintain the head on the pad when the head is positioned thereon.

7. In an apparatus for use in accurately facing and duplicating faces on heads of golf clubs, a readily portable facing fixture for supporting a head thereon for engagement by a facing cutter comprising a bottom plate and second plate mounted thereon and having means for supporting a head thereon, a cam plate movably mounted within said bottom plate, means for adjusting said cam plate longitudinally of said bottom plate so that an exposed edge portion of the cam plate is predeterminately positioned relative to said head supported on said facing fixture; means pivoting said second plate for lateral movement on said bottom plate, means for controlling the lateral adjustment of the second plate relative to the longitudinal axis of the bottom plate so that the head supported on said fixture is predeterminately angularly positioned relative to the cam plate, and clamping means arranged on said facing fixture to securely maintain the head on the pad when the head is positioned thereon.

8. In an apparatus for use in accurately facing and duplicating faces on heads of golf clubs, a readily portable facing fixture for supporting a head thereon for engagement by a facing cutter comprising a bottom plate, second plate and a top plate having means for supporting a head thereon, a cam plate movably mounted within said bottom plate, means for adjusting said cam plate longitudinally of said bottom plate so that an exposed edge portion of the cam plate is predeterminately positioned relative to said head supported on said facing fixture; means pivoting said second plate for lateral movement on said bottom plate, means for controlling the lateral adjustment of the second plate relative to the longitudinal axis of the bottom plate so that the head supported on said fixture is predeterminately angularly positioned relative to the cam plate, said top plate being hinged to said second plate and adapted to be vertically adjusted relative thereto, the means supporting a head on the top plate comprising a pad detachably secured thereto, means for controlling the vertical adjustment of said top plate to provide the proper pitch for said face, the longitudinal, lateral and vertical adjustments of the cam and plates relative to the bottom plate cooperating to predetermine the position of the head on said facing fixture whereby the contours of the face can be reproduced, and clamping means arranged on said facing fixture to securely maintain the head on the pad when the head is positioned thereon.

9. In an apparatus for use in accurately facing and duplicating faces on heads of golf clubs, a readily portable facing fixture for supporting a head thereon for engagement by a facing cutter comprising a bottom plate, second plate and a top plate having means for supporting a head thereon, means for urging said plates in cooperating relationship, a cam plate movably mounted within said bottom plate, means for adjusting said cam plate longitudinally of said bottom plate so that an exposed edge portion of the cam plate is predeterminately positioned relative to said head supported on said facing fixture; means pivoting said second plate for lateral movement on said bottom plate, means for controlling the lateral adjustment of the second plate relative to the longitudinal axis of the bottom plate so that the head supported on said fixture is predeterminately angularly positioned relative to the cam plate, said top plate being hinged to said second plate and adapted to be vertically adjusted relative thereto, the means supporting a head on the top plate comprising a pad detachably secured thereto, means for controlling the vertical adjustment of said top plate to provide the proper pitch for said face, the longitudinal, lateral and vertical adjustments of the cam and plates relative to the bottom plate cooperating to predetermine the position of the head on said facing fixture whereby the contours of the face can be reproduced, and clamping means arranged on said facing fixture to securely maintain the head on the pad when the head is positioned thereon.

10. In an apparatus for accurately shaping a face on a head of a golf club, a locating means adapted to cooperate with a head-supporting carrier, said locating means including a base plate, latching means mounted on said base for engaging a carrier in cooperating relationship therewith, means for actuating said latching means so that a carrier is operatively locked thereto and unlocked therefrom, and a plurality of positioning pins mounted on said base projecting outwardly therefrom for predetermining the position of a head of a golf club to be mounted on said carrier.

11. In an apparatus for facing heads of golf clubs having a supporting frame, a locating means fixed on said frame, a facing fixture adapted to carry a golf club head, said fixture being movably supported on said frame and adapted to cooperate with said locating means for locating said head thereon, and self-aligning guide means fixed to said locating means and said facing means adaptable to cooperate with each other so that the facing fixture is automatically and predeterminately positioned relative to said locating means.

12. In an apparatus for facing heads of golf clubs having a supporting frame, a locating means fixed on said frame, a facing fixture adapted to carry a golf club head, said fixture being movably supported on said frame and adapted to cooperate with said locating means for locating said head thereon, and self-aligning guide means fixed to said locating means and said facing means, said guide means comprising a pair of spaced forwardly projecting guide blocks fixed to the facing fixture, said blocks having an inclined cam portion forming a recess therebetween, a pair of forwardly projecting guide members fixed to said locating means, said members having outer inclined cam surfaces which are received within the recess formed by the cam portions, said cam surfaces on said locating means and facing fixture cooperating to align the locating means and fixture when the facing fixture is moved into cooperating relationship with the locating means.

13. In an apparatus for accurately facing heads of golf clubs, a locating means mounted on a frame, a facing fixture movable on said frame into cooperating relation with said locating means to aid in positioning a head of a golf club on the facing fixture, self-aligning guide means fixed to said locating means and said facing fixture adaptable to cooperate therewith so that the facing fixture is automatically and predeterminately positioned relative to said locating means, latching means on said locating means to securely maintain said facing fixture in predeterminately aligned position relative thereto for receiving a head thereon, means for moving the latch into locked position, said means being movable to release said latching means on said locating means from the facing fixture to free said fixture after a head is positioned on the fixture.

References Cited in the file of this patent

UNITED STATES PATENTS

| | | |
|---|---|---|
| 1,536,691 | Russ | May 5, 1925 |
| 1,580,184 | Vinton | Apr. 13, 1926 |
| 1,646,205 | Marshall | Oct. 18, 1927 |
| 1,678,792 | Shaw | July 31, 1928 |
| 1,787,615 | Cook | Jan. 6, 1931 |
| 1,932,818 | Guida | Oct. 31, 1933 |
| 2,050,348 | Lovejoy | Aug. 11, 1936 |